United States Patent
Razza et al.

(10) Patent No.: US 7,716,362 B1
(45) Date of Patent: May 11, 2010

(54) NETWORKED THIN CLIENT WITH DATA/MEMORY INTERFACE

(76) Inventors: Carl Razza, 9 Hoagland Rd., Flemington, NJ (US) 08822; Israel Amir, 32 Fleming Way, Princeton, NJ (US) 08540

( * ) Notice: Subject to any disclaimer, the term of this patent is extended or adjusted under 35 U.S.C. 154(b) by 1017 days.

(21) Appl. No.: 10/647,638

(22) Filed: Aug. 25, 2003

Related U.S. Application Data

(60) Provisional application No. 60/405,545, filed on Aug. 23, 2002.

(51) Int. Cl.
*G06F 12/00* (2006.01)
*G06F 15/16* (2006.01)
*G06F 17/30* (2006.01)
*H04N 7/18* (2006.01)

(52) U.S. Cl. .......... 709/232; 707/204; 709/203; 709/219; 709/230; 709/231; 725/80; 725/134

(58) Field of Classification Search .......... 709/230, 709/203, 219, 231, 232; 707/204; 725/80, 725/134

See application file for complete search history.

(56) References Cited

U.S. PATENT DOCUMENTS

| | | | | |
|---|---|---|---|---|
| 4,246,637 A | * | 1/1981 | Brown et al. ............ | 710/62 |
| 5,666,159 A | * | 9/1997 | Parulski et al. ......... | 348/211.2 |
| 5,799,150 A | * | 8/1998 | Hamilton et al. ........ | 709/203 |
| 5,806,005 A | * | 9/1998 | Hull et al. ............ | 455/566 |
| 5,917,542 A | * | 6/1999 | Moghadam et al. ...... | 348/231.99 |
| 5,920,863 A | | 7/1999 | McKeehan et al. | |
| 5,933,478 A | * | 8/1999 | Ozaki et al. ........... | 379/93.24 |
| 5,974,238 A | * | 10/1999 | Chase, Jr. ............ | 709/248 |
| 6,052,120 A | * | 4/2000 | Nahi et al. ............ | 715/700 |
| 6,084,584 A | * | 7/2000 | Nahi et al. ............ | 715/864 |
| 6,212,585 B1 | * | 4/2001 | Chrabaszcz ............ | 710/302 |
| 6,243,725 B1 | * | 6/2001 | Hempleman et al. ...... | 715/210 |
| 6,311,165 B1 | | 10/2001 | Coutts et al. | |
| 6,389,467 B1 | * | 5/2002 | Eyal ................. | 709/223 |
| 6,421,232 B2 | | 7/2002 | Sallam | |
| 6,584,404 B1 | * | 6/2003 | McBurney et al. ....... | 701/213 |
| 6,628,325 B1 | * | 9/2003 | Steinberg et al. ...... | 348/211.1 |
| 6,670,982 B2 | * | 12/2003 | Clough et al. ......... | 348/14.02 |
| 6,742,028 B1 | * | 5/2004 | Wang et al. ........... | 709/223 |
| 6,760,918 B2 | * | 7/2004 | Rodriguez et al. ...... | 725/134 |
| 6,784,924 B2 | * | 8/2004 | Ward et al. ........... | 348/207.1 |
| 6,789,111 B1 | * | 9/2004 | Brockway et al. ....... | 709/222 |
| 6,812,962 B1 | * | 11/2004 | Fredlund et al. ....... | 348/231.2 |
| 7,069,310 B1 | * | 6/2006 | Bartholomew .......... | 709/219 |
| 7,069,449 B2 | * | 6/2006 | Weaver et al. ......... | 713/193 |
| 7,103,760 B1 | * | 9/2006 | Billington et al. ..... | 713/1 |
| 7,148,918 B1 | * | 12/2006 | Yoda ................. | 348/211.3 |

(Continued)

*Primary Examiner*—George C Neurauter, Jr.
*Assistant Examiner*—Daniel C Murray
(74) *Attorney, Agent, or Firm*—Stolowitz Ford Cowger LLP

(57) ABSTRACT

A thin client device for use in a home network includes a network port by which the device connects to the home network and a data/memory port by which a data interface such as a memory card or communications port may be connected to the device. The device is configured such that data from the data interface is transferred to a server that is coupled to the home network. The transfer may be automatic or it may be controlled by a user. Where the thin client device includes signal processing hardware, the data from the data interface may be processed by the signal processing hardware and presented to the user.

26 Claims, 1 Drawing Sheet

U.S. PATENT DOCUMENTS

| | | | |
|---|---|---|---|
| 7,281,048 B2 * | 10/2007 | Watanabe | 709/229 |
| 7,321,923 B1 * | 1/2008 | Rosenberg et al. | 709/217 |
| 7,325,043 B1 * | 1/2008 | Rosenberg et al. | 709/219 |
| 7,336,775 B2 * | 2/2008 | Tanaka et al. | 379/93.17 |
| 7,366,788 B2 * | 4/2008 | Jones et al. | 709/230 |
| 7,376,699 B2 * | 5/2008 | Morris | 709/203 |
| 7,385,635 B2 * | 6/2008 | Kobayashi et al. | 348/231.99 |
| 7,432,948 B2 * | 10/2008 | Watanabe et al. | 348/14.02 |
| 7,533,091 B2 * | 5/2009 | Plastina et al. | 707/5 |
| 2001/0008504 A1 * | 7/2001 | Tanabe et al. | 369/32 |
| 2001/0010543 A1 * | 8/2001 | Ward et al. | 348/207 |
| 2001/0018737 A1 * | 8/2001 | Redford et al. | 713/2 |
| 2001/0037372 A1 * | 11/2001 | Tachi et al. | 709/217 |
| 2002/0013852 A1 * | 1/2002 | Janik | 709/231 |
| 2002/0032751 A1 * | 3/2002 | Bharadwaj | 709/218 |
| 2002/0103880 A1 * | 8/2002 | Konetski et al. | 709/218 |
| 2002/0112180 A1 * | 8/2002 | Land et al. | 713/200 |
| 2002/0194260 A1 * | 12/2002 | Headley et al. | 709/203 |
| 2003/0014496 A1 * | 1/2003 | Spencer et al. | 709/217 |
| 2003/0079077 A1 * | 4/2003 | Piau et al. | 711/103 |
| 2003/0236907 A1 * | 12/2003 | Stewart et al. | 709/231 |
| 2004/0024928 A1 * | 2/2004 | Billington et al. | 710/1 |
| 2004/0043819 A1 * | 3/2004 | Willis | 463/42 |
| 2004/0088731 A1 * | 5/2004 | Putterman et al. | 725/94 |
| 2005/0036034 A1 * | 2/2005 | Rea et al. | 348/207.1 |
| 2005/0177853 A1 * | 8/2005 | Williams et al. | 725/81 |
| 2005/0278442 A1 * | 12/2005 | Motoyama et al. | 709/224 |
| 2006/0004685 A1 * | 1/2006 | Pyhalammi et al. | 707/1 |
| 2006/0114787 A1 * | 6/2006 | Festal et al. | 369/59.1 |
| 2006/0265477 A1 * | 11/2006 | Bartholomew | 709/219 |
| 2007/0070404 A1 * | 3/2007 | Caradec et al. | 358/1.15 |
| 2007/0078899 A1 * | 4/2007 | Gulin et al. | 707/200 |
| 2008/0104473 A1 * | 5/2008 | Trott | 714/748 |
| 2009/0150409 A1 * | 6/2009 | Watson et al. | 707/10 |

* cited by examiner

US 7,716,362 B1

NETWORKED THIN CLIENT WITH DATA/MEMORY INTERFACE

This application claims the benefit of priority under 35 U.S.C. §119(e) of U.S. Provisional Application No. 60/405,545 filed Aug. 23, 2002, the contents of which are incorporated herein by reference.

FIELD OF THE INVENTION

The present invention concerns home networks and, in particular, a thin-client apparatus coupled to a home network that allows the network to transfer data between a server and a memory card or a communications port.

BACKGROUND

Computer Networks are gaining foothold in the home. Today home networks are used mainly to connect multiple computers to the Internet. The anticipation is, however, that home networks will soon be used for a variety of new applications. Several networking options are available to the consumer: Ethernet, Wireless technologies (802.11b, 802.11a, 802.11 g, BlueTooth), HPNA (Home Phone line Networks), Home Plug (Electrical wiring) and lately even cable coax networking. Prices are falling and penetration of networks into the home is dramatically increasing.

One use of home networking will certainly be for entertainment. The connected home will enable a variety of new capabilities such as streaming music from a storage location in the home (or the Internet) to anywhere in the house. Likewise, home networks will allow any television receiver in the home to view any content available anywhere in the house (or accessible through the Internet/Cable/Satellite).

The connected home may include multiple servers and thin clients. The major function of the server would be data storage and content distribution to clients. Thin clients are typically limited in functionality and lack independent storage such as a hard disk drive (HDD). Many of the consumer electronic devices around the home will become the thin clients of the future. Some consumer devices already have the ability to read Flash cards directly. For example, one can find a Flash card interface in DVD players. This feature allows the user watch either pictures or movies directly from a digital camera without the need to download the Flash card data to a PC, burn it into a CD and only then watch it on the TV.

It may be desirable for the information used by the thin client to be permanently retained for future use without the inconvenience of "going" to the server connecting a USB (or similar) cord to the PC and downloading the data into its designated database.

SUMMARY OF THE INVENTION

The invention is embodied in a peripheral port configuration for devices connected to a home network. According to one aspect of the invention, a device includes a network port by which the device connects to the home network and a data/memory port by which a data interface may be connected to the device. The device is configured such that data from the data interface may be transferred to a server that is coupled to the home network.

According to one aspect of the invention, the data is transferred automatically from the data interface to the server.

According to another aspect of the invention, the data is transferred from the data interface to the server in response to a command entered into the device.

According to yet another aspect of the invention, the data interface is coupled to signal processing apparatus in the device and the device is configured to process the data available from the device.

According to another aspect of the invention, the data interface is a memory card interface.

According to yet another aspect of the invention, the data interface is a data communications port.

DETAILED DESCRIPTION OF THE INVENTION

Figure 1:
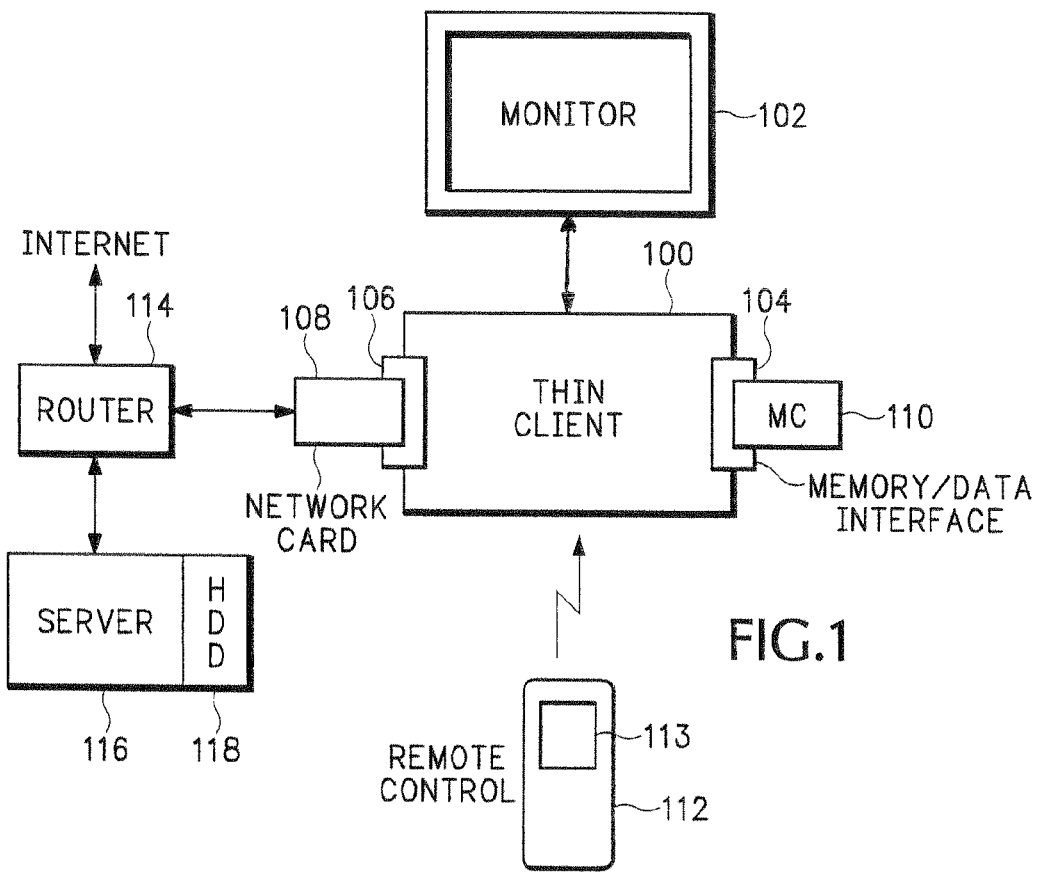
FIG. 1 is a block diagram of a home network including a device containing an interface according to the subject invention.

The invention is embodied in a non-mobile thin client coupled to a home network. These devices include but not limited to: DVDs, Set Top Boxes (STB), TVs, and Audio players. According to the invention a thin client has a network port and a data/memory port. The data/memory port includes a memory storage interface such as Flash card interface (includes but not limited to MMC, SMC, Compact Flash, SD, Sony stick, etc.) or a data communications port interface, such as a USB interface, PCMCIA interface and others.

In the exemplary embodiment of the invention, the thin client is configured to read the data from the data/memory port. This can be done automatically when the thin client detects the existence of a connection to its data/memory port or manually by the user using the thin client interface. The data then can be sent to a server for further processing. The transmission can be automatically initiated or manually initiated by the user. The data may include multiple segments (files). According to one exemplary embodiment, the user may control the thin client and direct it to transmit only certain files to the server. In the exemplary embodiment of the invention, the server is configured to receive the data, process it (if desired) according to commands it receives from the thin client and archive the data on the HDD.

In one embodiment of the invention a data/memory card is added to a networked DVD player interface can be PCMCIA or any other memory card or data communications interface. The network can be either wired or a wireless one. The DVD player can read images on a Flash Card (taken with a conventional digital camera) or from any other memory source. The images can then be viewed on the DVD (the DVD player in this case is configured to decode and display JPEG images). According to one embodiment of the invention the user can select the images to be archived on the server (using a remote control, for example). The selected images are then transmitted to the server using the local area network. The server then archives the received images on its local HDD. The user can then view these images on the thin client by using the same local area network to transfer the data from the server to the thin client.

In another example, a movie can be downloaded from the FLASH or other memory source, watched and/or archived in the remote server through the Network.

In another embodiment of the described invention the thin client is embodied in an STB is equipped with a memory card. The STB can be configured to process the data (such as images or movies) and send the data to the server for archive. If the STB is not configured to process the data it just serves as a conduit. It transfers the data to the server for archiving.

In yet another exemplary embodiment of the invention, a networked television receiver (smart TV) is equipped with a data/memory interface. This smart TV can process the data downloaded through the data/memory port for display and/or send it for archiving in the same manner as explained above.

In another preferred exemplary embodiment, a networked audio thin client is equipped with a data/memory port for playing data transferred from the data/memory interface. As in all the other cases, the data can be sent to the server for archiving.

It is noted that while the server in the described embodiment is a part of the Local Area Network, the server does not need to be co-located with the thin client. It may, for example, be a remote server accessed by the thin client via a global information network (e.g. the Internet).

It is also noted that while the figure shows a wired network, the network in all above examples may be wireless.

FIG. 1 is a block diagram of a home network that includes a thin client 100 according to the subject invention. The thin client 100 includes a network interface 106 that is coupled to receive a network card 108, for example, a PCMCIA network card. The thin client also includes a memory/data port 104 that may be coupled to receive a memory card 110. In the exemplary embodiment shown in FIG. 1, the thin client is a DVD player that includes an output for providing video signals to a monitor 102. As described above, however, the subject invention is not limited to this configuration. The thin client may be any device that is coupled to a home network, as described below with reference to FIG. 2.

Although the thin client is shown as receiving a network card 108 at a network interface 106, it is contemplated that the network card may be internal to the thin client, in which case the network interface would be configured to receive a network cable. Alternatively, either the external network card or the internal network connection may be a wireless device, and there may be no physical connection to the thin client.

In the exemplary system shown in FIG. 1, the network card 108 is coupled to a router 114 that is also connected to a server 116 and to a global information network (e.g. the Internet). The server 116 includes a HDD 118 on which it archives data transferred from the memory card 110.

In the system shown in FIG. 1, a user inserts the memory card 110 into the memory/data interface 104 to view pictures contained on the memory card using the DVD thin client 100 and monitor 102. In one embodiment of the invention, as soon as the memory card 110 is inserted into the interface 104, the data is transferred, via the network card 108 and router 114 to the server 116 where it is archived on the HDD 118. In this embodiment, all of the data stored in the memory card 110 is automatically archived on the server 116.

In an alternative embodiment, the user controls the transfer of data from the memory card 110 to the server 116 using, for example, the remote control 112. In this embodiment, the thin client 100 includes software that reads data from the memory card 110, displays either the data or title information for the data on the monitor 102 and then allows the user to select data to be transferred to the server 116. In this embodiment, the selection software may, for example, use the menu system of the thin client (i.e. the DVD player) to format and display the extracted data and to receive and process user commands provided via the remote control 112.

Figure 2:
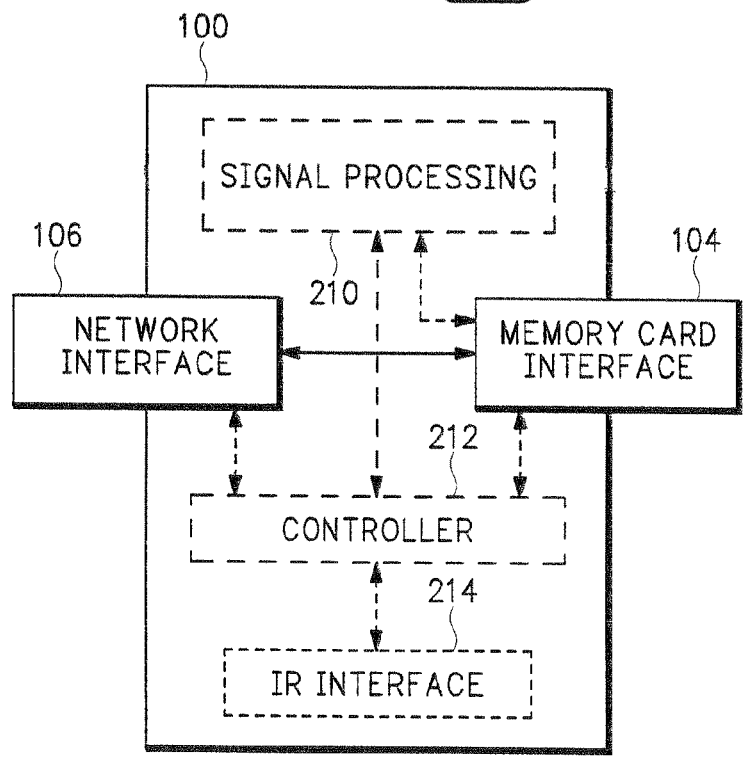
FIG. 2 is a block diagram of an interface according to the subject invention.

FIG. 2 is a block diagram of an exemplary thin client device 100. This device includes the memory card interface 104, the network interface 106, optional signal processing hardware 210, an optional controller 212 and an optional IR interface 214. As shown in FIG. 2, the memory card interface 104 may be coupled directly to the network interface 106 so that the server 116 may control transfer of data from the memory card interface 104 using the network interface 106. Thus, a simple thin client device 100 may include only the memory card interface 104 and the network interface 106. For a thin client device of this type, all data is automatically transferred from the memory card 110 to the server 116 or is transferred under control of the server.

Instead of a memory card interface 104, it is contemplated that the memory/data interface 104 may be a conventional data communications interface, for example, a universal serial bus (USB) port or a Personal Computer Memory Card International Association (PCMCIA) card interface. These interfaces may not accept a memory card 110 directly but, allow a user to connect the thin client to another device that contains the data. The USB port, for example, may allow a user to connect the thin client 100 to a digital camera using the camera's USB cable without having to remove the memory card from the camera.

A more complex thin client 100 may also include a controller 212 and an infrared (IR) interface 214. With these additions, the thin client 100 may transfer data under control of a remote control device 112. If the remote control 112 includes a display 113, the controller 212 may transfer data from the memory card 110 to the display 113 and the user can select data to be transferred to the server 116 using the remote control 112. As an alternative to using the display on the remote control, the thin client 100 may include a small display device (not shown) that may be used to display the data.

In this more complex thin client 100, the memory card interface 104 may not be connected directly to the network interface 106 but may be coupled to the network interface through the controller 212.

In a typical configuration, the thin client 100 is integrated with a consumer electronic device that is coupled to the home network. In the example shown in FIG. 2, the consumer electronic device is indicated by the signal processing hardware 210. This may be, for example, a DVD player/recorder, a CD player/recorder, a set-top box (STB) a television receiver or other consumer electronic device. In this embodiment, the controller 212 may be a processor that exists in the standard consumer electronic device to implement control functions. Similarly, the IR interface 214 may be the IR receiver of the consumer electronic device used to receive commands from the remote control unit 112.

If the consumer electronic device includes a function display, this display may be used to control data transfer from the memory card 110 to the server 116, as described above. If the device includes circuitry for formatting and displaying control information as a video signal (i.e. an on-screen display processor), this circuitry may be used to display data extracted from the memory card 110 and to display the extracted data on the monitor 102 to aid the selection of data for transfer from the memory card 110 to the server 116. In this embodiment, it may also be desirable to use other elements of the signal processing software to decode and present content data from the memory card. If, for example, the device 100 is a DVD player, its decoding hardware may be used to decode and display JPEG images on the memory card 110 and its audio decoder may be used to decode and play MP3 content stored on the memory card.

A networked thin client having a data/memory port for importing data into a home network has been described. Also, a method of archiving the imported data to a remote server using the network has been described.

While the invention has been described in terms of exemplary embodiments, it is contemplated that it may be practiced as described above with variations that are within the scope of the following claims.

What is claimed is:

1. A thin client device integrated with a consumer electronic device for use in a network comprising:
    a signal processor configured to process media content for playback by the consumer electronic device;
    a network port configured to couple the thin client device to a server on the network, the server including a hard disk drive;
    a data/memory port configured to selectively interface with a memory device holding data comprising media content;
    a controller configured to control data transfer between the network port and the data/memory port including, in one mode, fully automatic control enabling transferring substantially unidirectionally data stored at the memory device through the data/memory port to the server through a global information network using the network port and archiving the data in a hard disk drive of the server responsive to automatically detecting the existence of the memory device through the data/memory port and substantially simultaneously with selective interfacing of the memory device with the data/memory port;
    a first internal line configured to couple the data/memory port to the signal processor; and
    a second internal line configured to couple the data/memory port to the network interface;
wherein the controller is configured to enable parallel data transfer of the media content using the first internal line and the second internal line such that the media content is concurrently available to the signal processor for archiving in the hard disk drive of the server and for processing responsive to automatically detecting the existence of the memory device;
wherein the data/memory port includes a memory storage interface.

2. The thin client device according to claim 1,
    wherein a reader is configured to display a menu representing predetermined portions of the media content individually extractable from the data for consumer playback; and
    wherein the controller is configured to control, in an alternative mode, transferring substantially unidirectionally, based on user input using the menu, selected ones of the predetermined portions of the media content to the server via the network port.

3. The thin client device according to claim 1, wherein the reader is a card reader.

4. The thin client device according to claim 1, wherein the data/memory port comprises a data communications port.

5. The thin client device according to claim 1, wherein the thin client device is integrated with a digital versatile disc (DVD) player.

6. The thin client device according to claim 1, wherein the thin client device is integrated with a television set-top box.

7. The thin client device according to claim 1, wherein the thin client device is integrated with a television receiver.

8. The thin client device according to claim 1, wherein the thin client device is integrated with a compact disc (CD) player.

9. A method comprising:
    automatically detecting a memory device selectively coupled to a data port of a thin client on a global information network, the data port including a memory storage interface;
    automatically reading data stored on the memory device, the data including media content;
    transferring substantially unidirectionally the data read from the memory device to a server on the global information network through the data port and a network port coupled to the server and archiving the data in a hard disk drive of the server responsive to automatically detecting the existence of the memory device through the data port and initiating transfer of the media content of the memory device substantially simultaneously with selective coupling of the memory device with the data port; and
    concurrently with archiving the data, internally providing the media content to a signal processor integrated with the thin client for processing or playback.

10. The method of claim 9 further comprising displaying a menu representing predetermined portions of media content individually extractable from the data for consumer playback and providing selective control of the data transfer enabling, in an alternative mode, transferring substantially unidirectionally, based on user input using the menu, selected ones of the predetermined portions of the media content through the network port to the server.

11. The method of claim 10 further comprising displaying the menu with predetermined portions represented by titles based on the data stored on the memory device and, based on the titles displayed, issuing commands to the thin client based on remote user input using the menu to select the selected ones of the predetermined portions of the data for transferring substantially unidirectionally.

12. The method of claim 9 where transferring the data read from the memory device includes wireless transfer of the data read from the memory device to the server on the global information network.

13. The method of claim 9 further comprising:
    displaying the data read from the memory device as images on a display;
    transferring substantially unidirectionally at least one image to the server responsive to the at least one image being selected from the images displayed; and
    requesting the storing of the at least one displayed image on the server after transferring.

14. The method of claim 13 further comprising requesting the transfer of the at least one image from the server to the thin client after storing the at least one image on the server.

15. A machine-readable medium having instructions stored thereon that, if executed by a thin client, cause the thin client to perform a method comprising:
    automatically detecting a memory device selectively coupled to a data port of a thin client on a global information network, the data port including a memory storage interface;
    automatically reading data stored on the memory device coupled to the data port of the thin client on the global information network, the data including media content;
    transferring substantially unidirectionally the data read from the memory device to a server on the global information network through the data port and a network port coupled to the server and archiving the data in a hard disk drive of the server responsive to automatically detecting the existence of the memory device and automatically initiating transfer of the media content of the memory device substantially simultaneously with selective coupling of the memory device with the data port; and
    concurrently with archiving the data, internally providing the media content to a signal processor integrated with the thin client for processing or playback.

16. The machine-readable medium of claim 15 where execution of the instructions further results in requesting the data to be processed at the server.

17. The machine-readable medium of claim 15 where execution of the instructions further results in requesting the data read from the memory device to be archived at a hard disk drive located in the server after transferring.

18. The machine-readable medium of claim 15 where transferring the data read from the memory device includes wirelessly transferring the data read from the memory device to the server on the global information network.

19. The machine-readable medium of claim 15 where execution of the instructions further results in:
displaying the data read from the memory device as images on a display;
selecting at least one image displayed on the display;
transferring the at least one image selected to the server responsive to the selecting; and
storing the at least one image on the server after transferring.

20. The machine-readable medium of claim 19 where execution of the instructions further results in requesting the transfer of the at least one image from the server to the thin client after storing the at least one image on the server.

21. A thin client integrated with a consumer electronic device comprising:
means for configuring a signal processor to process media content for playback by the consumer electronic device;
means for configuring a network port to couple the thin client to a global information network;
means for detecting a memory device holding data comprising media content and selectively coupled to the thin client by a data port, the data port including a memory storage interface;
means for enabling data transfer between the data port and the network port; and
means for providing control of the data transfer including, in one mode, fully automatic control enabling transferring substantially unidirectionally data stored in the memory device coupled to the data port to the global information network via the network port and archiving the data in a hard disk drive of a server connected to the global information network responsive to automatically detecting the memory device selectively coupled to the thin client substantially simultaneously with selective coupling of the memory device with the data port
means for coupling the data port to the signal processor over a first internal line;
means for coupling the data port to the network interface over a second internal line; and
means for configuring the controller to enable parallel data transfer of the media content to the first internal line and the second internal line such that the media content is concurrently available to the signal processor for archiving in the hard disk drive of the server and for processing or playback responsive to automatically detecting the existence of the memory device.

22. The thin client of claim 21 comprising:
means for displaying a menu representing predetermined portions of the media content individually extractable from the data for consumer playback;
means for providing control enabling, in an alternative mode, transferring substantially unidirectionally, based on user input using the menu, selected ones of the predetermined portions of the media content in the memory device through the data port to the global information network via the network port for archiving in the hard disk drive of the server connected to the global information network.

23. The thin client of claim 21 comprising means for processing the data available at the data port.

24. The thin client of claim 21 where the thin client is integrated with a digital versatile disc (DVD) player.

25. The thin client of claim 21 where the thin client is integrated with a television set-top box.

26. The thin client of claim 21 where the client is integrated with a television receiver.

* * * * *